July 20, 1926.
A. J. MARCELIN
1,593,089
APPARATUS FOR INDICATING THE COURSE OF AIRCRAFT
Filed Feb. 1, 1924     5 Sheets-Sheet 1
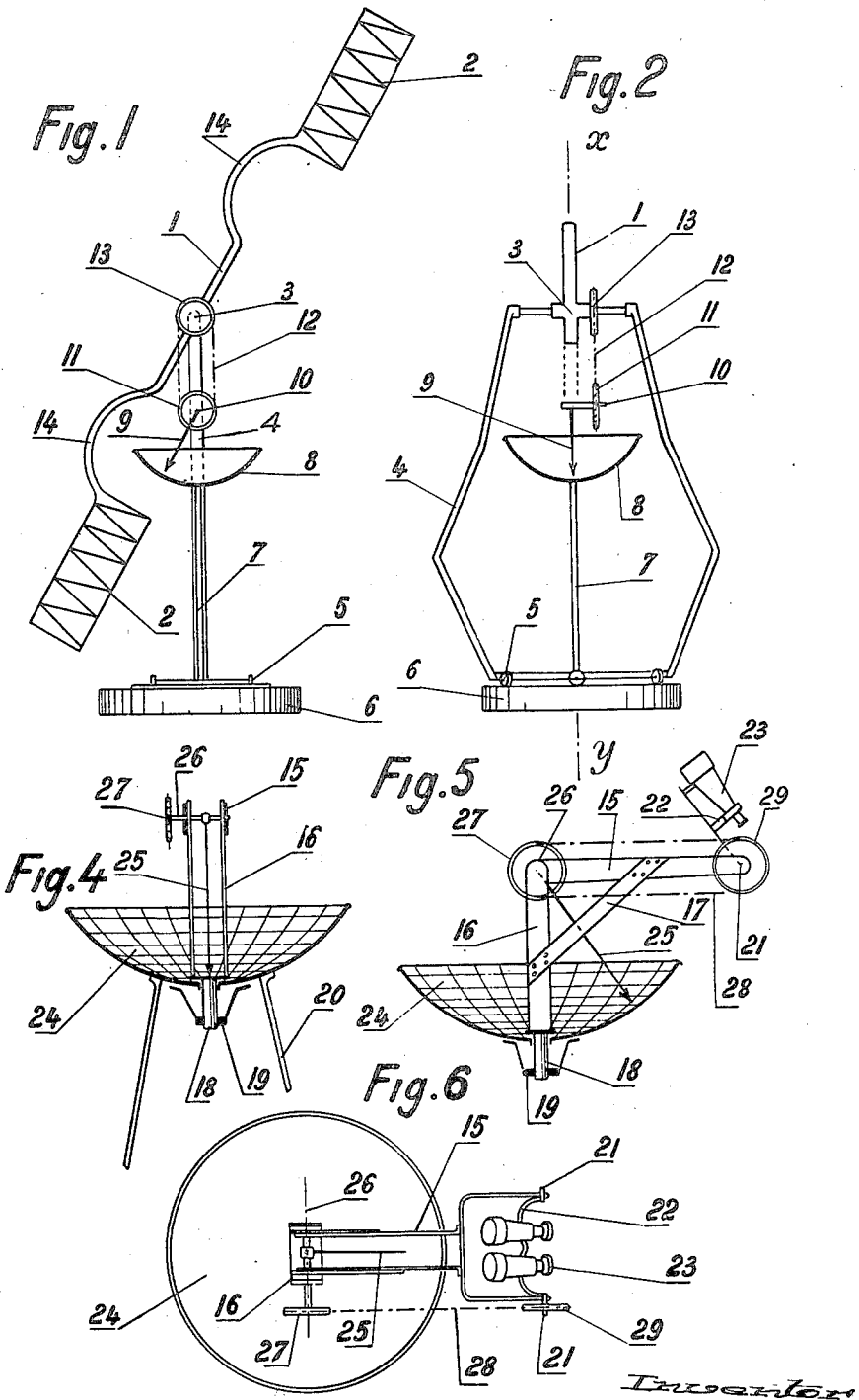

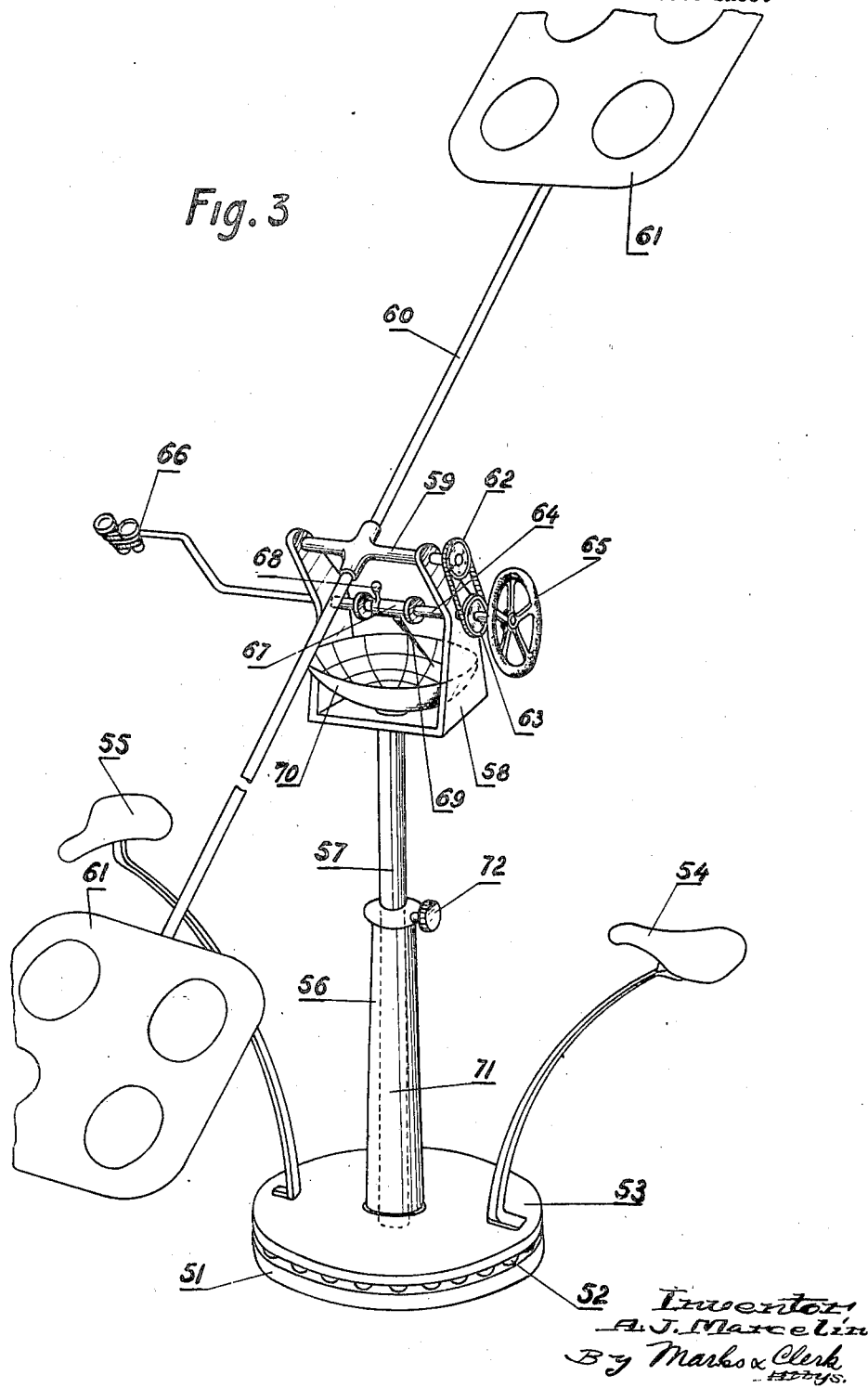

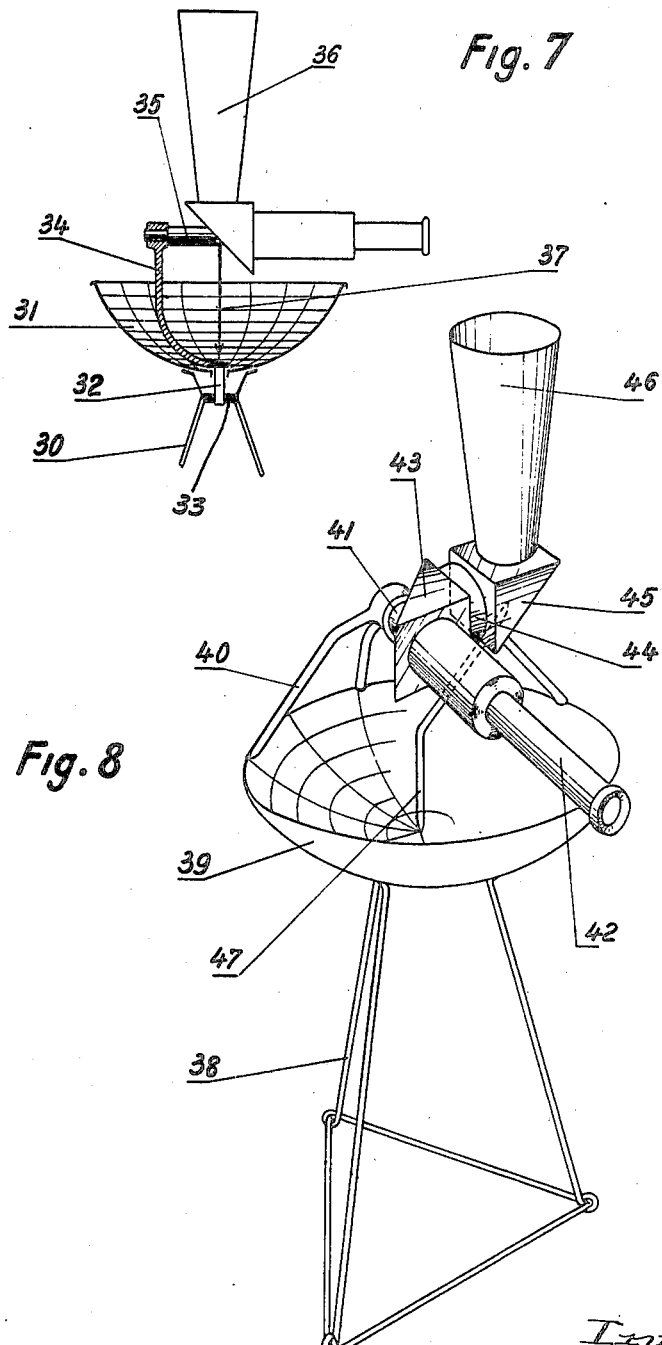

July 20, 1926.                                                                1,593,089
A. J. MARCELIN
APPARATUS FOR INDICATING THE COURSE OF AIRCRAFT
Filed Feb. 1, 1924          5 Sheets-Sheet 4
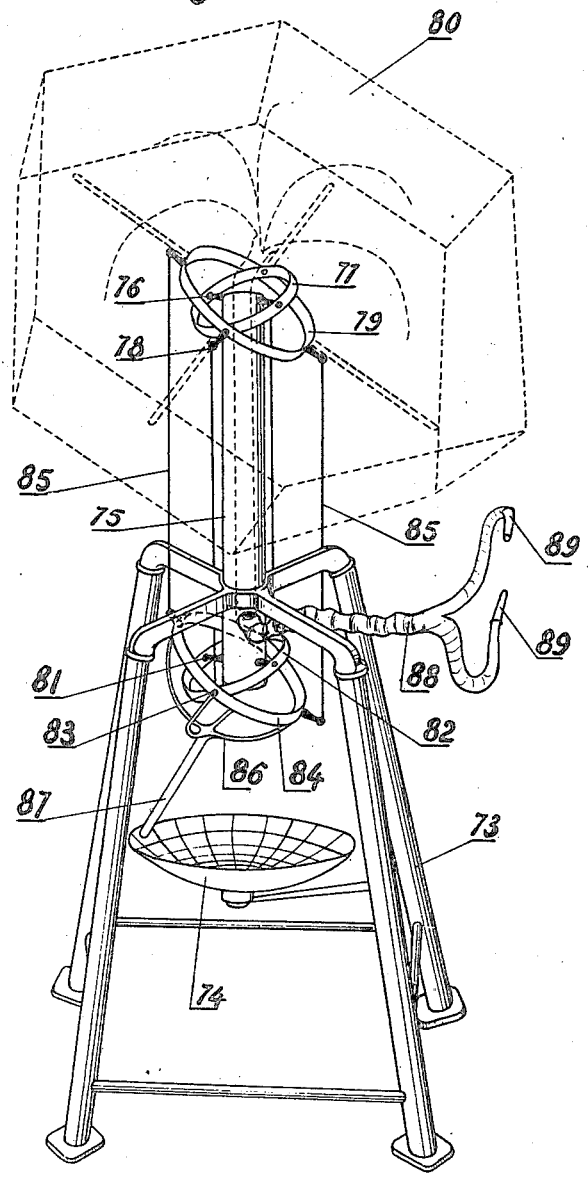

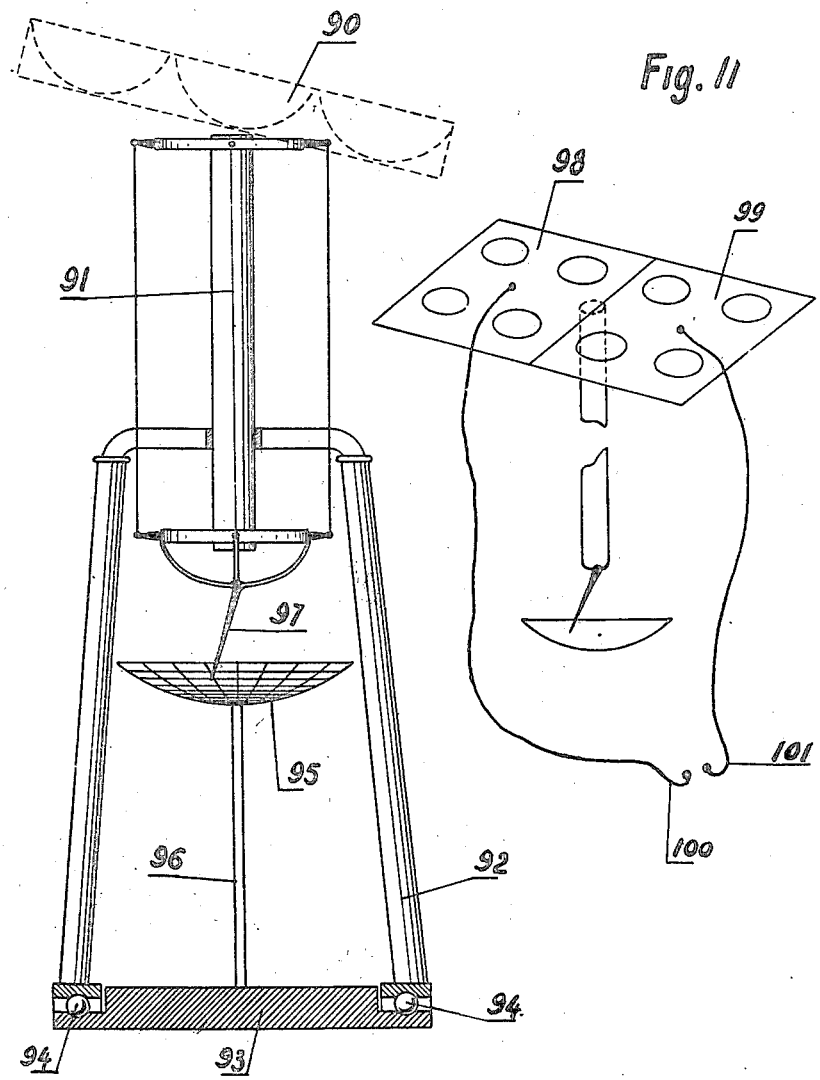

Patented July 20, 1926.

1,593,089

UNITED STATES PATENT OFFICE.

ANDRÉ JULES MARCELIN, OF PARIS, FRANCE.

APPARATUS FOR INDICATING THE COURSE OF AIRCRAFT.

Application filed February 1, 1924, Serial No. 690,102, and in France February 13, 1923.

In anti-aircraft firing operations, it is indispensable to observe the course of the aircraft at each instant. When the position of the aircraft has been determined by sighting, a certain time will elapse before the co-ordinates have been transmitted to the gunners, before these co-ordinates have been applied to the firing apparatus, and before the shot is fired (gunners time) . . . and on the other hand, a certain time is required for the projectile to attain the target. The firing must therefore be effected upon a position of the aircraft which is situated upon its trajectory in advance of the determined position.

The same difficulty is encountered, but to a greater degree, in the case of night firing operations, during which the position of the aircraft is found by the listening method, for inasmuch as a certain time is required for the sound to reach the listening apparatus, the position of the aircraft thus determined will be so to speak an anterior position, in which the aircraft is no longer situated when the sound is heard. When it is desired to illuminate the aerial object by the beams from electric projectors, it becomes necessary when directing the beams to take due account of the travel of the object during the time required by the operations, such as the transmission of co-ordinates and the application of the same to the projectors.

In the case of firing operations, it is further necessary to take account of the trajectory covered during the time taken by the projectile to attain the target.

It is therefore indispensable to ascertain at each instant the course of the aircraft, in order to determine the position of the aircraft upon its course with the greatest degree of precision, either for the illumination of the same by searchlight beams or for cannon firing.

My invention relates to an automatic course indicating apparatus which essentially comprises a pointer secured to the apparatus employed for finding the position of the aircraft such as a field glass, telescope, listening device or the like, and remaining in all cases parallel to the line connecting the observer (or the centre of the acoustic elements where the listening method is employed), the said pointer co-operating with a concave hemispherical element upon which it marks out a course corresponding to the actual course of the aircraft.

The said course indicator can be readily converted into a course registering device, and it will suffice to provide the end of the pointer with a soft pencil point which is urged by a small spring, or a like device, thus recording the course upon the concave spherical surface which may have a coating of white enamel.

The appended drawings show by way of example various constructional forms of the said indicating device.

Figs. 1 and 2 represent a course indicating device in accordance with the invention as employed in conjunction with a listening apparatus designated as "Perrin sitemeter."

Fig. 1 is a diagrammatic elevational view of the apparatus provided with a course indicator, and Fig. 2 is a like elevational view at 90 degrees from Fig. 1.

Fig. 3 is a modification.

Figs. 4, 5 and 6 relate to the use of the route indicator in conjunction with a listening device employed with the unaided ear and provided with a field glass for night use. Fig. 4 is an elevational view of the apparatus. Fig. 5 is a like view at 90 degrees from Fig. 4. Fig. 6 is a plan view.

Fig. 7 is an elevational view of a course indicating device employed in conjunction with an ordinary right-angled telescope.

Fig. 8 is a perspective view of the course indicator in conjunction with a right angled telescope with fixed eye-piece and revoluble objective, of the type described in the application Serial No. 690,038, filed by Mr. Jean Perrin and the applicant, entitled: "Telescope of the right-angled type with fixed eye-piece and revoluble objective, chiefly applicable to the observation of aerial objects."

Figs. 9 to 11 relate to the use of the said indicating device in conjunction with a simplified listening apparatus.

The sitemeter of the Perrin type is an acoustic listening apparatus based upon the transfer of sound and essentially comprising a bar 1 having at either end a sound receiving element of suitable shape 2; the said bar is movable on a horizontal axle 3 upon a frame which is revoluble on a vertical axis and is adapted for azimuth orientation.

In the constructional form shown in Figures 1 and 2, the main frame 4 carrying the axle 3 is so formed as to afford a free space for the middle part of the apparatus, and is mounted at the bottom on rollers 5 adapted to roll upon a fixed base 6 during the rotation of the apparatus on the vertical centre line $x$—$y$.

At the centre of the base 6 is mounted an upright 7 supporting a concave spherical element 8 upon which are inscribed circular arcs with azimuth graduation and also parallel circles with site graduation. Above the said element is suspended a pointer 9 secured to a horizontal shaft 10 having thereon a wheel or pulley 11 which is suitably connected by cable, belt or chain 12 with a like wheel or pulley 13 of the same diameter which is mounted on the axle of rotation 3 of the bar 1. Obviously, this method of transmission is used solely to permit the use of a pointer of comparatively short length, but it is not essential, and the pointer 9 may be secured directly to the axle 3. The bar 1 has two curved portions 14 corresponding to the shape of the concave element 8, whereby the maximum site displacement of the said bar may be obtained.

The pointer 9 will thus follow all the azimuth and site movements of the acoustic receiving elements, and it will be in all cases parallel to the line connecting the centre of the acoustic elements with the position of the air craft as determined by the listening operation. This indication can be in all cases expressed in terms of azimuth and site, and the different successive positions will show the course of the aircraft. It will thus be feasible by extrapolation to transmit to searchlights or to cannon the co-ordinates of the aircraft when in its succeeding position, upon which the beam or the projectile are to be directed.

Fig. 3 shows a constructional form which has a smaller size and can be more readily transported.

Upon the lower fixed base 51 is revoluble, through the medium of the ball-bearings 52, a movable base 53 having thereon the seats 54, 55 and the telescoping support 56, 57. The members supporting the seats are mounted upon the rotating base independently of the said telescoping support. At the upper part of the latter support is mounted a fork 58 which serves as a bearing for a horizontal axle 59 upon which is caused to pivot the bar 60 carrying the acoustic receiving elements 61. To one end of the axle 59 is keyed a pulley or a gear wheel 62 coacting with a like pulley or wheel 63 keyed to a shaft 64 having at the end a hand-wheel 65. The shaft 64 is made in two parts, and the outer end has mounted thereon a field glass 66 which is adapted for orientation in site, and is also adapted for azimuth orientation independently of the main frame. A small mechanical device, not shown, serves to fix the field glass in the azimuth position in such manner that its axis is situated in a vertical plane parallel to the site bar. A sleeve 67 can be engaged—by operating the handle 68—with the shaft portion 64 having thereon the pulley 63 and hand-wheel 65, or with the shaft portion 64 secured to the field-glass 66; said sleeve has mounted thereon a pointer 69 co-operating with the concave hemispherical element 70 which is stationary and is graduated for azimuth and elevation; the said element is mounted on the top of a telescoping upright 71 which traverses the support 56, 57 and is secured to the base 51. A set screw 72 serves to secure the tube 57 at the proper height within the tube 56.

The operator engaged with the listening in the site position occupies the seat 54 opposite the hand-wheel 65 which he operates, thus pivoting the bar 60 on the axle 59, until he obtains the sensation of the passage of sound from one ear to the other. The operator engaged with the listening in the azimuth position occupies the seat 55; he listens without a head-piece, and rotates the whole apparatus on the axis of the support 56, 57, while at the same time he sights with the field glass 66 in order to locate the aircraft. If he discovers the same, he rotates the whole apparatus according to azimuth until the bar 60 is normal to the axis of the field glass 66; he then clamps the latter according to azimuth and engages the pointer with the pivoting axis of the field glass according to site.

The pointer 69 follows the azimuth movements of the whole apparatus and the movements (according to site) of the listening device or the field glass 66, depending upon the position of the shaft 64 with which the said pointer is engaged, and the latter thus indicates upon the concave element 70 the course of the aircraft with or without aberration, according as the observation is of an acoustic or an optical nature. To transport the apparatus, the tube 57 is telescoped completely into the tube 56 and the acoustic elements 61 are removed from the bar 60, whereby the space occupied by the device is much reduced.

Figs. 4 to 6 relate to the use of the route indicating apparatus with a listening table employed with the unaided ear. The listening table, in the usual form, is a circular table in horizontal position which is revoluble on a vertical axis and is thus adapted for azimuth orientation. In the present case the table consists of a right-angled frame comprising a horizontal portion 15 and a vertical portion 16 connected by braces 17. The vertical portion 16 ends in a vertical axle 18 revoluble in a horizontal support 19 which is held by tripod 20.

At the end of the horizontal part 15 is pivoted a horizontal shaft 21 mounted on a support 22 holding a field glass for night observation 23; this device is used to find the site and to follow the aircraft after it has been perceived for instance by the light of the searchlights.

Upon the support 20 is mounted a stationary hemispherical element 24 having azimuth and elevation graduations as above mentioned, and traversed at the centre by the axle 18. A pointer 25 is secured, in co-axial position, to the horizontal shaft 26 pivoted in the horizontal part 15 of the frame and having at the end the wheel or pulley 27, connected by chain, belt or cable with a light wheel or pulley 29 mounted at the end of the shaft 21; in this manner the said pointer will follow the observing apparatus in all its azimuth or elevation movements. The method of operating is thus the same as in the preceding case; the course shown by the pointer is either the course of the aircraft in the anterior position if the listening method has been employed, or the course of the aircraft in the actual position if the aircraft has been observed with the field glass 23.

The apparatus shown in Fig. 7 is intended for use during the day. The stationary hemispherical element 31 which is mounted on the support 30 is graduated as in the preceding case and is traversed at the centre by a vertical axle 32 rotating in a horizontal bearing collar 33. The axle 32 is secured to a support 34 having revoluble therein a horizontal shaft 35 carrying the right-angled telescope 36. A pointer is secured to the shaft 35 coaxially with the element 31 and it thus follows the azimuth movements of the field glass 36 on the axle 32 and its site movements on the shaft 35. The method of operation remains the same.

Fig. 8 shows the use of the course indicator with a telescope wherein the eye-piece is stationary and the objective is adapted for orientation, the axes of rotation being those employed in the Perrin telesitemeter, i. e. axis of the plane of the course and axis of sweep.

Upon the base 38 is disposed the stationary hemispherical element 39 which is provided as before with azimuth and site graduations. At the edge of said element is mounted a bracket 40 in which is revoluble the horizontal shaft 41 whose centre line represents the axis of the plane of the course. On the said shaft is revoluble the eye-piece tube 42 ending in the total reflection prism 43; the latter has laterally secured thereto a shaft 44 (whose centre line represents the axis of sweep), said shaft (and centre line) being constantly perpendicular to the plane of the course; upon the said shaft is pivoted a second total reflection prism 45 carrying the objective 46. To the prism 45 is secured a pointer 47 which is suitably curved so that for the position of the apparatus corresponding to an angle of sweep of zero (position shown in the figure) the pointer will be situated in the vertical centre line of the said hemispherical element; the pointer will thus follow the double movement of the objective, and by reason of the graduations on the said element these indications will be converted directly into data for azimuth and site, corresponding to the graduations upon projectors and cannon. The operation of the apparatus is thus the same as in the preceding cases.

Figs. 9 and 10 show two forms of construction relative to the use of the course indicator with a listening device of a particularly simple construction whereby a single operator is enabled to observe the sky either by day or by night; being of a relatively inexpensive construction, it will be of service in all cases in which a more elaborate listening device is not essential. This apparatus, which from a mechanical point of view is comparable to the telesitemeter, consists of a single receiver directed normally to the zenith and pivoting on two mutually perpendicular axes whereof one is constantly horizontal (axis of the plane of the course) and the other (axis of sweep) is horizontal when the apparatus is directed to the zenith, and is constantly perpendicular to the plane of the course. The observer whose ears are connected with the single acoustic-element acts by means of a control device resembling an aeroplane control stick in order to turn the said acoustic element on the two axes, and he thus determines by the maximum value of the sound the direction which is occupied by the aircraft.

In the constructional form shown in Fig. 9, the frame 73 carries in the interior the hemispherical element 74 which has an azimuth and a site graduation. In the centre line of the said element is situated the vertical upright 75 which is mounted upon the main frame. At the upper part of the said upright is disposed a horizontal shaft 76 upon which is pivoted a small Cardan circle 77 provided with a shaft 78 perpendicular to the preceding and having pivoted thereupon the large Cardan circle 79, to which is secured the receiving element 80.

At the lower part of the upright 75 is a horizontal shaft 81 parallel to the shaft 76 and having pivoted thereupon the small Cardan circle 82; the latter is provided with a shaft 83 perpendicular to the preceding and parallel to the shaft 78; upon the shaft 83 is pivoted the large Cardan circle 84 which is connected by pivoted rods 85 with the upper large circle 79. To the large circle 84 is secured a frame which is composed of two large semi-circles in perpendicular position and supporting an arm 87 serving as a pointer co-operating with element 74. A flexible pipe 88 connected with the conduits of the receiver 80 traverses the hollow upright 75 and ends in one or more ear-pieces 89.

The single observer, preferably seated in front of the apparatus, places the ear-pieces in the ears and manipulates the lever 87 for the orientation of the apparatus until he obtains the maximum value of the sound; the arm 87 thus serves as a control lever and as an indicating pointer. For transportation purposes, the size of the apparatus can be reduced by lowering the upright 75 and connected parts into the interior of the frame.

The apparatus shown in Fig. 10 is specially intended for sighting upon the horizon in an allotted direction. The acoustic receiver 90 is mounted as in the preceding case by means of a Cardan arrangement at the top of the upright 91, but when the two Cardan axes are horizontal, the receiver instead of pointing towards the zenith, makes a certain angle, for instance 15 degrees, with the horizontal plane. The whole device is mounted upon a frame 92 which is revoluble—through ball-bearings 94—upon the stationary base 93, for azimuth orientation. The hemispherical element 95 is mounted upon the upright 96 secured to the base 93. It should be observed that when the Cardan axes are horizontal, the pointer 97 should have an inclination corresponding to that of the acoustic element 90.

The operation is as follows. The operator commences by turning the frame 92 on its centre line so as to place the receiver in the desired observing direction; the receiver occupies an inclined position in order that the device may be accurately directed towards the horizon. The operation is then carried out as in the preceding cases.

Instead of employing a single acoustic element, the apparatus may comprise two such elements 98 and 99, Fig. 11, which are independent, each element being connected to one of the observer's ears by a tube 100 or 101 respectively. The observer seeks to perceive the sensation of the passage of the sound with the maximum intensity.

In the several apparatus set forth, the indicating pointer consisting of a material object may be replaced by a beam of light, and the indications relative to the course are now obtained by drawing a line representing the path of the beam upon a graduated plane surface in the known manner (cotangent chart in current use for anti-aircraft operations).

What I claim is:

1. In an apparatus for indicating the course of an aircraft, a searching device, a hollow hemispherical element, scribing means mounted at the center of said element for universal movement over the surface thereof and means mounting and connecting said device and scribing element for universal movement in unison whereby actuation of said device to follow an aircraft causes a corresponding movement of said scriber over the surface of said element.

2. In an apparatus for indicating the course of an aircraft, a stationary hollow hemispherical element the axis of which is vertical, a horizontal shaft, means mounting the said shaft for rotation in a horizontal plane with reference to the said element, a searching device mounted on said shaft, scribing means mounted at the center of the hemispherical element, a second horizontal shaft parallel to above mentioned first horizontal shaft and on which said scribing means are mounted, means for rotating the two shafts together, and means whereby the angular rotations of the searching device and of the scribing means round their respective shafts are equal.

3. In an apparatus for indicating the course of an aircraft, a stationary hollow hemispherical element the axis of which is vertical, a telescoping upright supporting said element, a horizontal shaft, a telescoping support surrounding the telescoping upright and adapted for rotation about the same, a fork borne by said support and supporting the said horizontal shaft, a searching device mounted on said shaft, scribing means mounted at the center of the hemispherical element, the direction of which is parallel to the searching direction, a second horizontal shaft parallel to above-mentioned first horizontal shaft, borne by the said support and on which said scribing means are mounted, a pinion keyed to each shaft and a transmission chain connecting both pinions.

4. In an apparatus for indicating the course of an aircraft, a stationary hollow hemispherical element the axis of which is vertical, a telescoping upright supporting said element, a horizontal shaft, a telescoping support surrounding the telescopic upright and adapted for rotation about same, a fork borne by said support and supporting the said horizontal shaft, a listening device mounted on said shaft, scribing means mounted at the center of the hemispherical element, a sleeve bearing the said scribing means, a second horizontal shaft parallel to abovementioned first horizontal shaft, borne by one tine of said fork and on which said sleeve is loosely mounted, a pinion keyed to each shaft, a transmission chain connecting both pinions, a third horizontal shaft borne by the other tine and in alignment with the second horizontal shaft, a field glass supported by said third horizontal shaft, a clutch device whereby the scribing means is secured at will to either of the two last mentioned shafts and points parallel to the corresponding searching direction.

In witness whereof I have hereunto set my hand.

ANDRÉ JULES MARCELIN.